No. 644,039. Patented Feb. 20, 1900.
L. B. BENTON.
FLEXIBLE PIPE.
(Application filed Aug. 29, 1898.)
(No Model.)
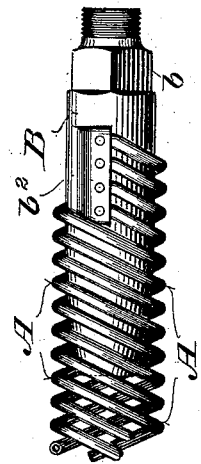
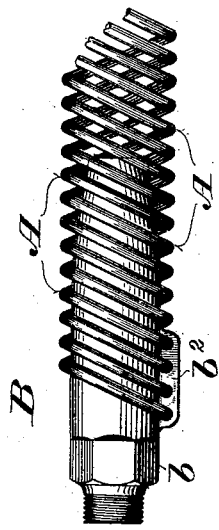
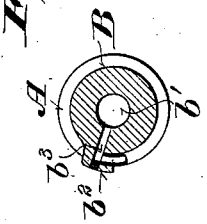
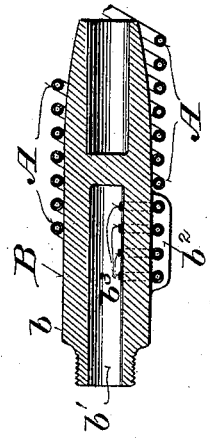
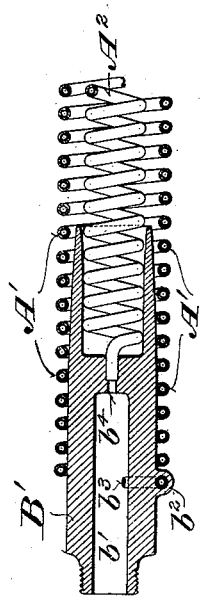

UNITED STATES PATENT OFFICE.

LINN BOYD BENTON, OF NEW YORK, N. Y., ASSIGNOR TO THE AMERICAN TYPE FOUNDERS' COMPANY, OF NEW JERSEY.

FLEXIBLE PIPE.

SPECIFICATION forming part of Letters Patent No. 644,039, dated February 20, 1900.

Application filed August 29, 1898. Serial No. 689,753. (No model.)

*To all whom it may concern:*

Be it known that I, LINN BOYD BENTON, a citizen of the United States, residing at New York, (New Brighton,) borough of Richmond, in the county of Richmond and State of New York, have invented certain new and useful Improvements in Flexible Pipes, of which the following is a specification, reference being had to the accompanying drawings, forming a part thereof.

The main object of my invention is to produce a flexible metallic pipe or conduit without movable joints to take the place of rubber hose for conveying fluids, particularly such as would destroy or injure or be injured by rubber.

It consists generally in a pipe composed of one or more helical or spirally-bent metallic tubes attached at the ends to tubular couplings or fittings, and particularly in certain novel features of construction and combinations of parts, as hereinafter particularly described, and pointed out in the claims.

In the accompanying drawings like letters designate the same parts in the several figures.

Figure 1 is a side elevation of the end portions of a jointless flexible metallic pipe embodying my invention. Fig. 2 is a longitudinal section of one end thereof. Fig. 3 is a cross-section, and Fig. 4 is a longitudinal section showing a modified construction of the pipe.

Referring to Figs. 1 to 3, inclusive, A A designate the spirally-coiled metal tubes, and B B the metal end fittings or couplings of which the flexible pipe or conduit is composed. The tubes A and the fittings or couplings B may be made of any suitable metal, according to the nature of the fluid to be conveyed therein. Each fitting or coupling B is generally of cylindrical shape on the outside and is tapered on its inner end, around which the spiral tubes A are coiled to allow a gradually-increasing amount of flexure of the coils of the tubes from the point or points of attachment to the fitting toward the middle of the pipe. At the other end it may be formed with an external screw-thread and a squared portion or head $b$ for attachment to a reservoir or pipe or to any other device with which the flexible pipe is to be connected. It is also formed with an axial bore or passage $b'$, closed at its inner end and open at its outer end, and with a lateral projection $b^2$, having a radially-disposed face through which openings $b^3$ are made into the passage $b'$ for the attachment of the ends of the tubes A, as shown in Fig. 3. These openings, which communicate with the passage $b'$, may be conveniently made by drilling holes in a radial direction through the outer face of the projection $b^2$ into the passage $b'$ and intersecting holes through the radial face of said projection and then plugging the outer ends of the radial holes, so as to produce angular connecting passages between the tubes A and the axial passage in the fitting or coupling. The ends of the tubes A are fitted and brazed or otherwise secured in the outer ends of said openings or passages $b^3$, and one or more of the coils of each tube is brazed or otherwise attached to the outer face of the fitting B, so as to relieve the joint at the end of the tube from strain and to prevent abruptly bending the tube at that point. The inner contracted end of the fitting extending some distance into the end of the spiral formed by the tubes serves to support and hold the same in the proper relation to each other and to prevent abrupt bending of the pipe and its component tubes at or near its ends, where said tubes join the end fitting. One or any number of spiral tubes of any desired length and diameter may be employed in the construction of the pipe or conduit, according to the capacity and the degree of flexibility required. An end fitting may be provided at each or only one end, according to the use that is to be made of the device. If it is to form a tight connection between two fluid reservoirs or conduits and is to convey fluid under pressure, fittings or couplings will be required at both ends.

Instead of coiling the several component spiral tubes around the outside of the end fitting or coupling parallel with each other they may be arranged as shown in Fig. 4, in which one tube $A'$ is shown coiled around the outside of the end fitting $B'$ and another tube $A^2$ is coiled in the opposite direction inside of the tube $A'$. The outer tube $A'$ is attached to the end fitting in a manner similar to that shown in Figs. 1 to 3, inclusive, and the end of the inner tube $A^2$ is inserted and secured in a longitudinal opening $b^4$ through the inner end of the fitting into its axial bore or passage $b'$.

By the construction herein shown and described I am enabled to produce a jointless flexible pipe or conduit of metal which will neither injuriously affect nor be affected by fluids that will destroy or injure rubber or will be injured by contact with rubber and which will convey fluids under pressure without leaking, at the same time permitting change in the relative positions of the ends of the pipe or conduit or of the parts connected thereby without interrupting the flow of fluid.

Various changes in the minor details of construction may be made within the spirit and intended scope of my invention.

I claim—

1. A flexible pipe or conduit consisting of one or more spirally-bent metallic tubes and a tubular fitting or coupling to which each of said tubes is attached, said fitting or coupling being tapered toward its inner end and extending inwardly beyond the attachment thereto of said tube or tubes so as to allow a gradually-increasing flexure of the pipe and avoid abrupt bending thereof, substantially as and for the purposes set forth.

2. A flexible metallic pipe consisting of one or more spirally-bent tubes and one or more end fittings or couplings each formed with a longitudinal bore or passage, and a lateral opening in which an end of a spiral tube is secured, substantially as and for the purposes set forth.

3. A flexible metallic pipe consisting of one or more spiral tubes and one or more end fittings or couplings each formed with a longitudinal bore or passage and a lateral projection having a radially-disposed face through which an opening is formed into said bore or passage, one end of each tube being inserted and secured in such an opening, substantially as and for the purposes set forth.

4. A flexible metallic pipe or conduit for fluids, consisting of one or more spirally-bent tubes, and one or more tubular end fittings or couplings each formed with a lateral projection having a radially-disposed face through which one or more openings are made into the bore or passage of the fitting or coupling, each tube being coiled around such fitting or coupling and secured at the end in one of the lateral openings therein, and one or more of the end coils of the spiral being attached to the outer face of the fitting or coupling, substantially as and for the purposes set forth.

5. A flexible pipe or conduit consisting of a tubular metallic fitting, one or more spirally-bent metallic tubes each coiled around the outside and communicating with the bore of said fitting through a lateral opening therein, and one or more spirally-bent metallic tubes arranged within the spiral of the first-mentioned tube or tubes and inserted and secured in an opening in the inner end of said fitting in communication with the aforesaid bore thereof, substantially as and for the purposes set forth.

In witness whereof I hereto affix my signature in presence of two witnesses.

LINN BOYD BENTON.

Witnesses:
M. F. BENTON,
L. W. BAEUCHLE.